(12) United States Patent
Rajabally et al.

(10) Patent No.: US 11,498,450 B2
(45) Date of Patent: Nov. 15, 2022

(54) FORECAST OF ELECTRIC VEHICLE STATE OF CHARGE AND ENERGY STORAGE CAPACITY

(71) Applicant: ROLLS-ROYCE plc, London (GB)

(72) Inventors: Talib E. Rajabally, Nottingham (GB); Maszatul Mansor, Sheffield (GB)

(73) Assignee: Rolls-Royce PLC, London (GB)

( * ) Notice: Subject to any disclaimer, the term of this patent is extended or adjusted under 35 U.S.C. 154(b) by 300 days.

(21) Appl. No.: 16/867,676

(22) Filed: May 6, 2020

(65) Prior Publication Data

US 2020/0369175 A1 Nov. 26, 2020

(30) Foreign Application Priority Data

May 21, 2019 (GB) ..................................... 1907140

(51) Int. Cl.
*B60L 58/12* (2019.01)
*G06F 16/245* (2019.01)
(Continued)

(52) U.S. Cl.
CPC ............... *B60L 58/12* (2019.02); *B60L 53/62* (2019.02); *B60L 53/63* (2019.02); *B60L 55/00* (2019.02);
(Continued)

(58) Field of Classification Search
CPC .......... B60L 58/12; B60L 53/62; B60L 53/63; B60L 55/00; B60L 53/51; B60L 53/52;
(Continued)

(56) References Cited

U.S. PATENT DOCUMENTS

| 7,928,693 | B2 | 4/2011 | Hafner et al. |
| 9,248,752 | B2 * | 2/2016 | Kuribayashi ..... H02J 13/00034 |

(Continued)

FOREIGN PATENT DOCUMENTS

| CN | 107169588 A | * | 9/2017 | ......... G06F 17/5009 |
| CN | 108805322 A | * | 11/2018 | ............. G06Q 50/30 |

(Continued)

OTHER PUBLICATIONS

M. Hadi Amini at al., (Amini), Effect of Electric Vehicle Parking Lots'Charging Demand as Dispatchable Loads on Power Systems Loss, 2016, IEEE, pp. 0499-0502 (Year: 2016).*

(Continued)

*Primary Examiner* — M Baye Diao
(74) *Attorney, Agent, or Firm* — Shumaker & Sieffert, P.A.

(57) ABSTRACT

A computer-based method is provided of forecasting total electric vehicle state of charge and total electric vehicle energy storage capacity in a parking area having parking bays with respective electrical vehicle charging and discharging facilities. Electric vehicles occupying the bays can provide temporary energy storage capacity to an energy grid. The forecasting method includes: forecasting future occupation of the bays by electric vehicles based on expected arrival times and expected stay durations; obtaining expected charge and discharge capabilities of the vehicles; forecasting a total state of charge and total energy storage capacity in the parking area; recording actual arrivals and departures; and adjusting the forecast of future occupation and the forecast of total state of charge and total energy storage capacity in the parking area.

14 Claims, 2 Drawing Sheets

(51) Int. Cl.
| | |
|---|---|
| *B60L 55/00* | (2019.01) |
| *B60L 53/62* | (2019.01) |
| *B60L 53/63* | (2019.01) |
| *H02J 3/32* | (2006.01) |
| *G07C 9/38* | (2020.01) |
| *G06Q 10/02* | (2012.01) |
| *G06Q 10/04* | (2012.01) |
| *G06Q 10/06* | (2012.01) |
| *G06Q 50/06* | (2012.01) |
| *G06Q 50/30* | (2012.01) |
| *H02J 3/38* | (2006.01) |
| *H02J 7/00* | (2006.01) |
| *B60L 53/51* | (2019.01) |
| *B60L 53/52* | (2019.01) |
| *B60K 6/28* | (2007.10) |

(52) U.S. Cl.
CPC ........... *G06F 16/245* (2019.01); *G06Q 10/02* (2013.01); *G06Q 10/04* (2013.01); *G06Q 10/06312* (2013.01); *G06Q 50/06* (2013.01); *G06Q 50/30* (2013.01); *G07C 9/38* (2020.01); *H02J 3/322* (2020.01); *H02J 3/381* (2013.01); *H02J 7/0047* (2013.01); *B60K 6/28* (2013.01); *B60L 53/51* (2019.02); *B60L 53/52* (2019.02); *B60Y 2200/91* (2013.01); *B60Y 2200/92* (2013.01); *B60Y 2300/91* (2013.01); *H02J 2300/20* (2020.01)

(58) Field of Classification Search
CPC ...... G06F 16/245; G06Q 10/02; G06Q 10/04; G06Q 10/06312; G06Q 50/06; G06Q 50/30; G07C 9/38; H02J 3/322; H02J 3/381; H02J 7/0047; B60K 6/28; B60Y 2200/91; B60Y 2200/92
USPC ......................................................... 701/22
See application file for complete search history.

(56) References Cited

U.S. PATENT DOCUMENTS

| | | | |
|---|---|---|---|
| 9,895,993 B2 * | 2/2018 | Kishida | ................ B60W 20/40 |
| 2011/0196692 A1 | 8/2011 | Chavez, Jr. et al. | |
| 2020/0139845 A1 * | 5/2020 | Henrichs | ................ H04L 12/40 |

FOREIGN PATENT DOCUMENTS

| | | | | |
|---|---|---|---|---|
| CN | 108663061 B | * | 11/2021 | ............. B60L 58/10 |
| WO | 2011102855 | | 8/2011 | |
| WO | WO-2019006995 A1 | * | 1/2019 | ............. B60L 58/10 |

OTHER PUBLICATIONS

Lakshminarayanan, et al., "Real-Time Optimal Energy Management Controller for Electric Vehicle Integration in Workplace Microgrid", IEEE Transactions on Transport Electrification, vol. 5, No. 1, Mar. 2019, pp. 174-185.

Chandra Mouli, et al., Integrated PV Charging of EV Fleet Based on Energy Prices, V2G, and Offer of Reserves, IEEE Transactions on Smart Grid, vol. 10, No. 2, Mar. 2019, vol. 10, No. 2, Mar. 2019, pp. 1313-1325.

Zou et al., "A Two-Stage Economic Optimization and Predictive Control for EV Microgrid", IECON 2018—44th Annual Conference of the IEEE Industrial Electronics Society, published 2018, IEEE, pp. 5951-5956.

Bui, et al, "A Strategy for Optimal Microgrid Operation Considering Vehicle-to-Grid Service," International Journal of Control and Automation, vol. 10, No. 3 (2017), pp. 405-418.

Great Britain search report dated Nov. 22, 2019, issued in GB Patent Application No. 1907140.6.

European Search report dated Sep. 30, 2020, issued in 20170537.3.

* cited by examiner

FORECAST OF ELECTRIC VEHICLE STATE OF CHARGE AND ENERGY STORAGE CAPACITY

CROSS-REFERENCE TO RELATED APPLICATIONS

This specification is based upon and claims the benefit of UK Patent Application No. GB 1907140.6, filed on 21 May 2019, which is hereby incorporated herein in its entirety.

BACKGROUND

Technical Field

The present disclosure relates to a method and system for forecasting total electric vehicle state of charge and total electric vehicle energy storage capacity in a parking area having parking bays with respective electrical vehicle charging and discharging facilities.

Description of the Related Art

Vehicle-to-grid (V2G) technologies relates to systems in which plug-in electric vehicles, such as battery electric vehicles (BEV), plug-in hybrids (PHEV) or hydrogen fuel cell electric vehicles (FCEV), communicate with a power grid to provide demand response services by either returning electricity to the grid or by throttling their charging rate. V2G storage capabilities can also enable EVs to store and discharge electricity generated from renewable energy sources such as solar and wind, with output that fluctuates depending on weather and time of day.

EVs and V2G technology are the subject of considerable recent research and development. For example, Van-Hai Bui, Akhtar Hussain and Hak-Man Kim, *A Strategy for Optimal Microgrid Operation Considering Vehicle-to-Grid Service*, International Journal of Control and Automation, Vol. 10, No. 3 (2017), pp. 405-418 recognises the role that EVs can play as temporary energy storage in a microgrid, and proposes an optimisation strategy as to how the continually varying capacity given unpredictable vehicle arrival and departure times, can be managed.

The present disclosure, however, is at least partly based on the recognition that it would be desirable to be able to forward forecast EV arrival and departure times as a means for effective scheduling of charging and discharging on a collective basis.

SUMMARY

Accordingly, in a first aspect, the present disclosure provides a computer-based method of forecasting total electric vehicle state of charge and total electric vehicle energy storage capacity in a parking area having parking bays with respective electrical vehicle charging and discharging facilities, whereby electric vehicles occupying the parking bays can provide temporary energy storage capacity to an energy grid, the forecasting method including steps of:

forecasting future occupation of the parking bays by electric vehicles based on expected arrival times and expected stay durations of electric vehicles entering the parking area;

obtaining expected charge and discharge capabilities of the electric vehicles forecast to enter the parking area;

forecasting, on the basis of the forecast of future occupation and the expected charge and discharge capabilities, a total electric vehicle state of charge and total electric vehicle energy storage capacity in the parking area;

recording actual arrivals and departures of electric vehicles at the parking area; and adjusting, on the basis of the recorded arrivals and departures, the forecast of future occupation and the forecast of total electric vehicle state of charge and total electric vehicle energy storage capacity in the parking area.

Advantageously, by forecasting total electric vehicle state of charge and total electric vehicle energy storage capacity in the parking area, the method has an effect of allowing enabling efficient use of the EVs in the parking area for the provision of electricity grid demand response services. This is because the forecast enables effective forward planning (e.g. it facilitates improved collective demand/load management) using the resources of the parking area, rather than merely reactive arrangements based on the instantaneous total state of charge and total storage capacity of the area.

Optional features of the forecasting method will now be set out. These are applicable singly or in any combination.

The forecasting method may include further steps of: confirming connections to the charging and discharging facilities of the parking bays of electric vehicles recorded as arriving at the parking area; and further adjusting, on the basis of the confirmed connections, the forecast of future occupation and the forecast of total electric vehicle state of charge and total electric vehicle energy storage capacity in the parking area. Indeed, in addition to confirming the connections, the forecasting method may include further steps of: measuring actual amounts of charge and energy storage capacities of the electric vehicles on their connection to the charging and discharging facilities of the parking bays; and further adjusting, on the basis of the measured actual amounts of charge and energy storage capacities, the forecast of total electric vehicle state of charge and total electric vehicle energy storage capacity in the parking area. In these ways, the accuracy of the forecast can be improved.

Conveniently, the expected arrival times and expected stay durations of electric vehicles entering the parking area may be determined from a computer-based parking reservation system for the parking area. Such a reservation system may be a commercial booking system (e.g. in the context of a parking area providing public commercial parking), a subscription or membership system (e.g. in the context of a parking area servicing a workplace), or a fleet management system (e.g. in the context of a parking area servicing a taxi or delivery fleet).

The expected charge and discharge capabilities of the electric vehicles may be obtained by interrogating one or more computer databases which cross-reference vehicle types against vehicle registration numbers. The vehicle registration numbers may be obtained by automatic number plate recognition (ANPR) on entry into the parking area, and/or from the afore-mentioned reservation system.

The forecasting method may include further steps of: obtaining inbound journey distance information for the electric vehicles expected to enter the parking area based at least in part on information from the parking reservation system; and predicting, on the basis of the inbound journey distance information, expected amounts of charge and energy storage capacities of the electric vehicles on their connection to the charging and discharging facilities of the parking bays; wherein the forecasting of the total electric vehicle state of charge and total electric vehicle energy storage capacity in the parking area is also performed on the basis of the predicted expected amounts of charge and energy storage capacities of the electric vehicles, which may be based on the vehicle type, as noted above. The forecasting method may cross-reference the vehicle type from the registration information in the parking reservation system obtained, for example from ANPR, as noted above, and the obtained energy storage capacity to predict a total energy capacity of the electric vehicles forecasted to be in the parking area. By taking into account the distance travelled by the vehicles, and hence the amount of charge likely to have been used before arrival at the parking area, the accuracy of the forecast can be improved. The inbound journey distance information may be obtained from the afore-mentioned reservation system. Preferably, the inbound journey distance information is supplemented by the pre-journey states of charge of the electric vehicles to improve the prediction of the expected amounts of charge and energy storage capacities of the electric vehicles.

Conveniently, the parking area may be a parking area of a transport facility where vehicles are parked for onward travel by passengers of the vehicles on another mode of transport offered by the transport facility. For example, the transport facility can be an airport, train station, coach/bus station or maritime port. The onward travel by the passengers increases the likelihood that the parked vehicles will remain parked for the expected stay durations, and thus increases confidence in the forecasting. For example, forecasting can be refined by updating predictions on vehicle disconnection times based on information on the drivers returning in-bound to their vehicles, e.g. flight touchdowns at an airport and/or subsequent requests for transfer to the parking area using a park-and-ride system.

In a second aspect, the present disclosure provides a method of operating an electricity grid which connects one or more sources of electrical power, one or more consumers of electrical power, and charging and discharging facilities of parking bays of a parking area for electric vehicles, the operating method including:

performing the forecasting method of the first aspect to forecast the total electric vehicle state of charge and total electric vehicle energy storage capacity in the parking area; and using the electric vehicles connected to the charging and discharging facilities to provide temporary energy storage capacity for the grid according to the forecasted total electric vehicle state of charge and total electric vehicle energy storage capacity, the electrical power generated by the one or more sources being stored by the connected electric vehicles for subsequent use by the one or more consumers.

For example, in the second aspect, the one or more sources of electrical power may include one or more sources of intermittent renewable power, such as solar power and wind power.

In a third aspect, the present disclosure provides a computer-based forecasting system for forecasting total electric vehicle state of charge and total electric vehicle energy storage capacity in a parking area having parking bays with respective electrical vehicle charging and discharging facilities, whereby electric vehicles occupying the parking bays can provide temporary energy storage capacity to an energy grid, the forecasting system being programed to perform the method of the first aspect. Thus, for example, the forecasting system may be programmed to:

forecast future occupation of the parking bays by electric vehicles based on expected arrival times and expected stay durations of electric vehicles entering the parking area;

obtain expected charge and discharge capabilities of the electric vehicles forecast to enter the parking area;

forecast, on the basis of the forecast of future occupation and the expected charge and discharge capabilities, a total electric vehicle state of charge and total electric vehicle energy storage capacity in the parking area;

record actual arrivals and departures of electric vehicles at the parking area; and adjust, on the basis of the recorded arrivals and departures, the forecast of future occupation and the forecast of total electric vehicle state of charge and total electric vehicle energy storage capacity in the parking area.

In a fourth aspect, the present disclosure provides a temporary energy storage system for supplying storage capacity to an energy grid, the temporary energy storage system including a parking area having parking bays with respective electrical vehicle charging and discharging facilities, whereby electric vehicles occupying the parking bays can provide temporary energy storage capacity to an energy grid, and further including the computer-based forecasting system of the third aspect for forecasting total electric vehicle state of charge and total electric vehicle energy storage capacity in the parking area.

In a fifth aspect, the present disclosure provides an electricity grid connecting one or more sources of electrical power (e.g. one or more sources of intermittent renewable power, such as solar power and wind power), one or more consumers of electrical power, and the temporary energy storage system of the fourth aspect.

Further aspects of the present disclosure provide: a computer program comprising code which, when the code is executed on a computer, causes the computer to perform the method of the first aspect; and a computer readable medium storing a computer program comprising code which, when the code is executed on a computer, causes the computer to perform the method of the first aspect.

DESCRIPTION OF THE DRAWINGS

Embodiments will now be described by way of example only, with reference to the Figures, in which.

DETAILED DESCRIPTION

Figure 1:
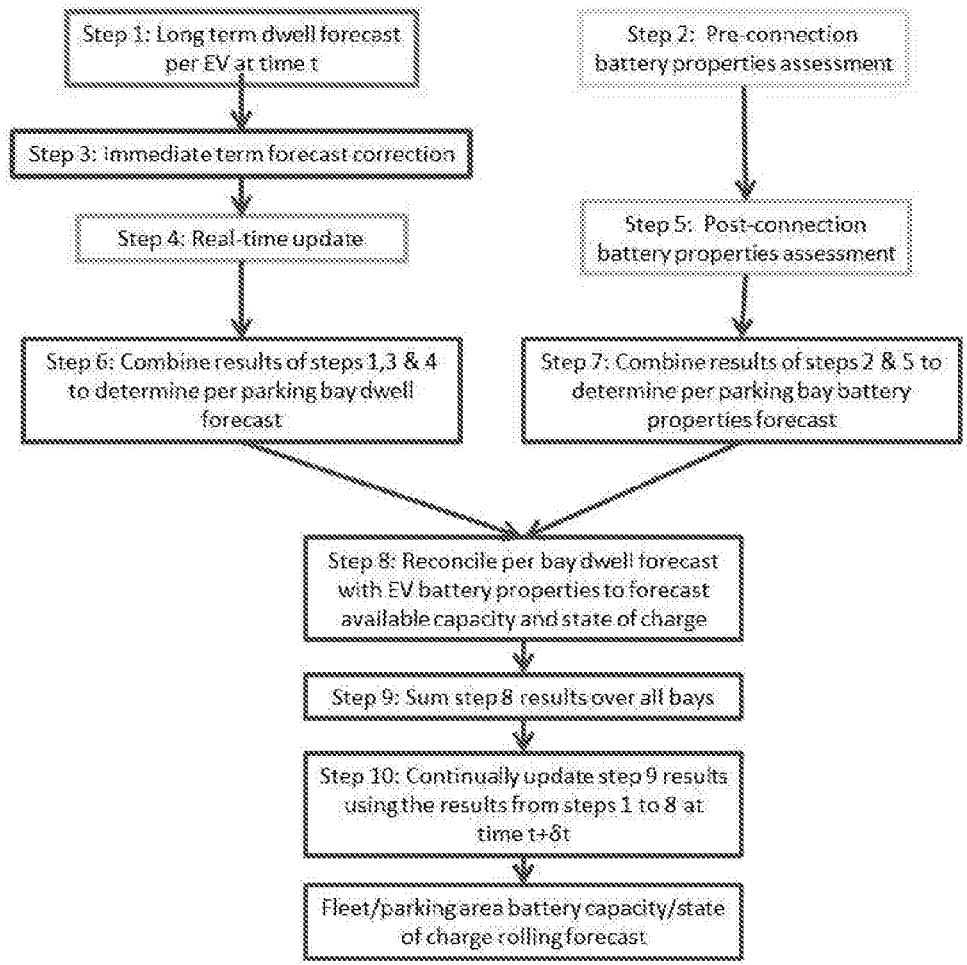
FIG. 1 shows schematically an overview of a method for forecasting total electric vehicle state of charge and total electric vehicle energy storage capacity in a parking area.

FIG. 1 shows schematically an overview of a computer-based method for forecasting total electric vehicle state of charge and total electric vehicle energy storage capacity in a parking area.

In step 1, a long term dwell forecast is made for each EV expected to occupy a parking space at a time t. This forecast of future occupation of the parking bays by the EVs is based on information of expected arrival times and expected stay durations of EVs entering the parking area. The information can be obtained in-advance, for example, by interrogating digital data sources such as an on-line reservation/fleet management system for the parking area.

In parallel at step 2, a pre-connection battery properties assessment is made. In particular, the expected charge and discharge capabilities of the EVs forecast to enter the parking area are obtained. These capabilities can be extracted, for example, from on-line manufacturer data sources.

Together, the information collected at step 1 and 2 allows a long term forecast to be made of the total EV state of charge and total EV energy storage capacity in the parking area.

Next, at step 3 an immediate forecast correction is made by recording actual arrivals and departures of EVs at the parking area, and adjusting, on the basis of the recorded arrivals and departures, the prediction made by the long term forecasts for the present time and the predictions made by the long term forecasts for future times. In this way, a rolling forecast of parking bay occupation and collective storage capacity and available charge over an entire parking area is obtained.

At step 4, a real-time update can be made to the rolling forecasts by confirming connections to the charging and discharging facilities of the parking bays of the EVS recorded as arriving at the parking area. In particular, a result is, at step 6, a determination of per parking bay dwell forecast.

In parallel, at step 5, a post-connection assessment of the actual battery properties of the connected EVs can be made. In particular, the actual amounts of charge and energy storage capacities of the EVs on their connection to the charging and discharging facilities of the parking bays can be measured. This allows at step 7, a better determination of the per parking bay properties forecast, so that, at steps 8 and 9 the forecast of total EV state of charge and total EV energy storage capacity in the parking area can be improved by reconciling the per bay dwell forecast and the per EV battery forecast.

As indicated at step 10, the previous steps are repeated in order to continually update the long term and immediate forecasts, the result being a rolling forecast of parking area collective battery capacity and state of charge. This can then be used in a method of operating an electricity grid which connects one or more sources of electrical power, one or more consumers of electrical power, and the EVs parked in the parking area. In particular, the EVs can provide temporary energy storage capacity for the grid according to the forecasted total electric vehicle state of charge and total electric vehicle energy storage capacity. That is, the electrical power generated by the one or more sources can be stored by the connected electric vehicles for subsequent use by the one or more consumers. Such an arrangement can be beneficial for efficient running of a local micro-grid. The approach is particularly applicable where there is a high degree of certainty in the EV dwell times and a large parking area capacity, as found for example where the parking area is a parking area of a transport facility (such as an airport, train station, coach/bus station or maritime port).

Figure 2:
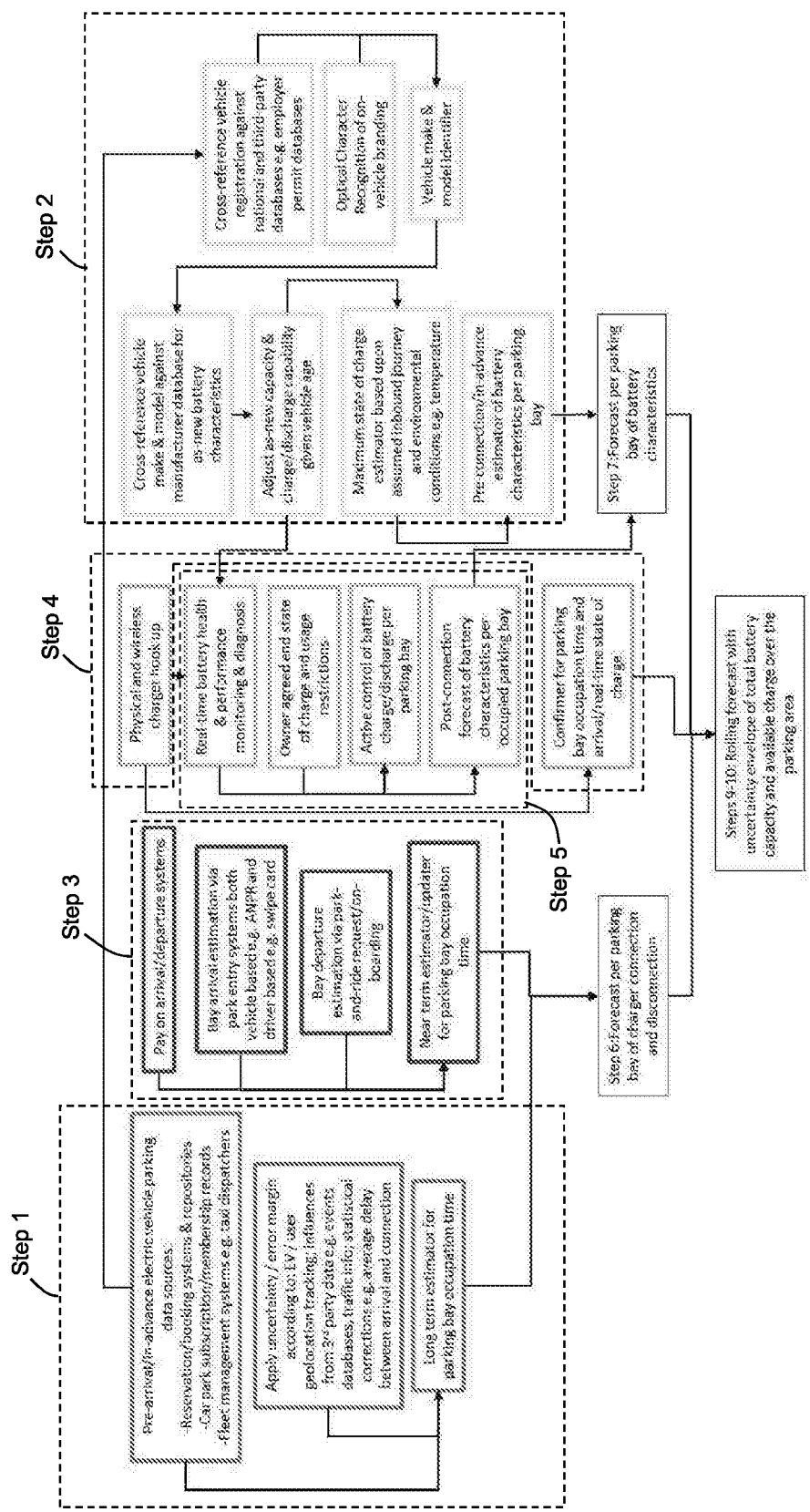
FIG. 2 shows a more detailed view of the forecasting method of FIG. 1.

FIG. 2 shows a more detailed view of the forecasting method of FIG. 1. Dashed outline boxes around respective groups of sub-steps indicate sub-steps which combine together to form some of the steps of FIG. 1.

In the approach discussed above, digital sources of information concerning the parking arrangements and the battery properties of electric vehicles are interrogated in order to provide a rolling forecast of the collective storage capacity and available charge over an entire parking area. Parking area occupation can be predicted from and then refined from: in-advance data sources such as on-line reservation/fleet management systems, on-arrival data sources such as barrier entry machines and real-time data sources such as charger connection. Separately, the as-fitted battery properties of expected/arriving vehicles can be extracted from manufacturer data sources whilst the up-to-date status of these properties are forecasted and then refined on arrival. These two parallel processes are continually updated and the results summated across the entire area in question. Preferably the as-fitted battery properties are adjusted to account for battery deterioration, e.g. on the basis of vehicle age and/or usage.

The arrangement can facilitate forward load/demand management (i.e. planning of coordinated vehicle charging such as staggered starts) to meet customer-agreed state-of-charge upon collection at minimum cost (i.e. in light of variable supply tariffs) and minimum battery degradation.

It can also facilitate forward scheduling of vehicle discharging to grid (i.e. acting in the role of temporary energy storage) to part mitigate generation shortfalls (e.g. intermittency of renewables) and provide valley-filling and ramp-up mitigation.

Embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

The term "computer readable medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a non-transitory computer readable storage medium. One or more processors may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

What is claimed is:

1. A computer-based method of forecasting total electric vehicle state of charge and total electric vehicle energy storage capacity in a parking area the forecasting method comprising:
    forecasting, by a processor, future occupation of parking bays in a parking area by electric vehicles based on expected arrival times and expected stay durations of the electric vehicles entering the parking area,
        wherein respective parking bays in the parking area comprise respective electrical vehicle charging and discharging facilities,
        wherein the respective electrical vehicle charging and discharging facilities are configured to connect electric vehicles occupying the parking bays to an energy grid,
        wherein the charging and discharging facilities are configured to provide temporary energy storage capacity to the energy grid from batteries of the electric vehicles;
    determining, by the processor, the expected arrival times and expected stay durations of electric vehicles entering the parking area based on information from a computer-based parking reservation system for the parking area;
    obtaining, by the processor, expected charge and discharge capacities of the electric vehicles forecast to enter the parking area, based at least in part on information from the parking reservation system;
    based on the obtained expected charge and discharge capacities of the electric vehicles forecast to enter the parking area, forecasting, by the processor, a total electric vehicle state of charge and total electric vehicle energy storage capacity in the parking area;
    recording, by the processor, actual arrivals and departures of electric vehicles at the parking area; and
    adjusting, by the processor and on the basis of the recorded arrivals and departures, the forecast of:
        future occupation of the parking bays;
        total electric vehicle state of charge; and
        total electric vehicle energy storage capacity in the parking area.

2. The forecasting method of claim 1 including further steps of:
    confirming connections to the charging and discharging facilities of the parking bays of electric vehicles recorded as arriving at the parking area; and
    further adjusting, on the basis of the confirmed connections, the forecast of future occupation of the parking bays, total electric vehicle state of charge, and total electric vehicle energy storage capacity in the parking area.

3. The forecasting method of claim 2 including further steps of:
    measuring actual amounts of charge and energy storage capacities of the electric vehicles on their connection to the charging and discharging facilities of the parking bays; and
    further adjusting, on the basis of the measured actual amounts of charge and energy storage capacities, the forecast of total electric vehicle state of charge and total electric vehicle energy storage capacity in the parking area.

4. The forecasting method of claim 1, wherein the reservation system for the parking area comprises any one or more of:
    a commercial booking system;
    a subscription or membership system; or
    a fleet management system.

5. The forecasting method of claim 1, further comprising:
    interrogating, by the processor, one or more computer databases which cross-reference vehicle types against vehicle registration numbers;
    obtaining, by the processor, a vehicle type for an electric vehicle forecast to enter the parking area based on the interrogating of the one or more computer databases; and
    obtaining, by the processor, a respective storage capacity for an electric vehicle forecast to enter the parking area wherein an electric vehicle storage capacity is based on the type of electric vehicle.

6. The forecasting method of claim 1, wherein forecasting the total electric vehicle state of charge includes the further steps of:
    obtaining, by the processor, inbound journey distance information for the electric vehicles expected to enter the parking area based at least in part on information from the parking reservation system; and
    predicting, by the processor, on the basis of the inbound journey distance information, an expected amount of charge used by a respective electric vehicle during the inbound journey;
    predicting, by the processor, an expected state of charge of the respective electric vehicle based at least in part on:
        the expected amount of charge used by a respective electric vehicle during the inbound journey; and
        the obtained expected charge and discharge capacities of the electric vehicles forecast to enter the parking area.

7. The forecasting method of claim 1, wherein the parking area is a parking area of a transport facility where vehicles are parked for onward travel by passengers of the vehicles on another mode of transport offered by the transport facility.

8. A method of operating an electricity grid, the method comprising:
    performing the forecasting method of claim 1 to forecast the total electric vehicle state of charge and total electric vehicle energy storage capacity in the parking area, wherein the electricity grid is configured to connect to:
        one or more sources of electrical power,
        one or more consumers of electrical power, and
        charging and discharging facilities of parking bays of a parking area for electric vehicles; and
    using the electric vehicles connected to the charging and discharging facilities to provide temporary energy storage capacity for the electricity grid according to the forecasted total electric vehicle state of charge and total electric vehicle energy storage capacity,
    generating electrical power, by the one or more sources of electrical power; and
    storing, by the connected electric vehicles, the electrical power generated by the one or more sources for subsequent use by the one or more consumers.

9. The operating method of claim 8, wherein the one or more sources of electrical power include one or more sources of intermittent renewable power.

10. A computer program comprising code which, when the code is executed on a computer, causes the computer to perform the method of claim 1.

11. A non-transitory computer readable medium storing a computer program comprising code which, when the code is executed on a computer, causes the computer to perform the method of claim 1.

12. A computer-based forecasting system for forecasting total electric vehicle state of charge and total electric vehicle energy storage capacity in a parking area, the forecasting system being programmed to:
   forecast future occupation of parking bays in a parking area by electric vehicles based on expected arrival times and expected stay durations of the electric vehicles entering the parking area,
      wherein respective parking bays in the parking area comprise respective electrical vehicle charging and discharging facilities,
      wherein the respective electrical vehicle charging and discharging facilities are configured to connect electric vehicles occupying the parking bays to an energy grid,
      wherein the charging and discharging facilities are configured to provide temporary energy storage capacity to the energy grid from batteries of the electric vehicles;
   determine the expected arrival times and expected stay durations of electric vehicles entering the parking area based on information from a computer-based parking reservation system for the parking area;
   obtain expected charge and discharge capacities of the electric vehicles forecast to enter the parking area, based at least in part on information from the parking reservation system;
   based on the obtained expected charge and discharge capacities of the electric vehicles forecast to enter the parking area, forecast, a total electric vehicle state of charge and total electric vehicle energy storage capacity in the parking area;
   record actual arrivals and departures of electric vehicles at the parking area; and
   adjust, on the basis of the recorded arrivals and departures, the forecast of:
      future occupation of the parking bays;
      total electric vehicle state of charge; and
      total electric vehicle energy storage capacity in the parking area.

13. A temporary energy storage system for supplying storage capacity to an energy grid, the temporary energy storage system including:
   a parking area having parking bays with respective electrical vehicle charging and discharging facilities, whereby electric vehicles occupying the parking bays provide temporary energy storage capacity to the energy grid, and
   the computer-based forecasting system of claim 12 for forecasting total electric vehicle state of charge and total electric vehicle energy storage capacity in the parking area.

14. An electricity grid connecting one or more sources of electrical power, one or more consumers of electrical power, and the temporary energy storage system of claim 13.

* * * * *